United States Patent [19]

Nagata et al.

[11] Patent Number: 5,937,820
[45] Date of Patent: Aug. 17, 1999

[54] FOUR CYCLE ROTARY ENGINE

[76] Inventors: Sumiyuki Nagata, Hokko 264, Banchi 57 Kitami City, Hokkaido, Japan, T090; Ryan Cobb, Sun City #1005 Kita 7 jo Higashi 3 cho me Higashiku, Sapporo, Japan, T060

[21] Appl. No.: 08/589,489

[22] Filed: Jan. 22, 1996

[30] Foreign Application Priority Data

Nov. 21, 1995 [JP] Japan .................................. 7-325212

[51] Int. Cl.⁶ .................................................. F02B 53/00
[52] U.S. Cl. .......................... 123/243; 418/185; 418/186; 418/255
[58] Field of Search .................... 123/230, 243; 418/185, 186, 255

[56] References Cited

U.S. PATENT DOCUMENTS

| 729,399 | 5/1903 | Palle ........................................ 418/255 |
| 793,390 | 6/1905 | Nipstad et al. ........................ 418/255 |
| 2,118,253 | 5/1938 | Larsen ..................................... 123/243 |
| 2,437,653 | 3/1948 | Rich . | |
| 3,181,512 | 5/1965 | Hapeman ................................ 123/243 |
| 5,640,938 | 6/1997 | Craze ..................................... 418/255 |

FOREIGN PATENT DOCUMENTS

| 0 007 535 A1 | 7/1979 | European Pat. Off. . | |
| 618326 | 5/1926 | France . | |
| 609464 | 7/1926 | France . | |
| 462013 | 7/1928 | Germany .............................. 123/230 |
| 21 02 694 C3 | 8/1972 | Germany . | |
| 21 67 283 C2 | 8/1972 | Germany . | |
| 2845239 | 2/1981 | Germany .............................. 123/243 |
| 6307252 | 11/1994 | Japan ..................................... 123/243 |
| 276959 | 10/1964 | Netherlands .......................... 123/243 |
| 116670 | 6/1946 | Sweden ................................. 123/243 |

*Primary Examiner*—Michael Koczo
*Attorney, Agent, or Firm*—Foley, Hoag & Eliot LLP

[57] ABSTRACT

A rotary engine consisting of a slightly oblong casing (10) housing a circular shaped rotor (12). Attached to the rotor are separating vanes (14) that slide in and out of the rotor to create separate chambers within the engine. Additionally, the rotor houses inlet valves (16) and exhaust valves (18) which draw in and expel the fuel/air mixture, respectively. The rotor houses the means for manipulating the valves.

14 Claims, 3 Drawing Sheets

FOUR CYCLE ROTARY ENGINE

BACKGROUND OF THE INVENTION

1. Field of the Invention

This invention relates to rotary engines.

2. Description of the Prior Art

Since it's invention in the 1950's the rotary engine has not enjoyed widespread production or success. The first rotary engine was the Wankel Rotary Engine (1950). It was invented as an alternative to the piston engine. The main advantage of the rotary engine is its small size. Since the invention of the original rotary engine several of the problems plaguing the design have been corrected. One such improvement is the apex seal which serves to reduce friction and fuel loss. Although several of the problems with the rotary engine have been corrected, significant ones still exist:

(a) There are engine vibration problems. The rotor churns in such a way as to cause it to vibrate. A balance weight must be added to decrease these vibrations. Even with this added weight there are still noticeable vibrations.

(b) There are friction problems. Indeed all engines have friction problems. Rotary engine designs however, have considerable friction. This is because the rotor must make three rotations inside the engine chamber for the drive shaft to rotate once. This 1:3 rotor to drive shaft ratio causes friction and heat problems.

(c) There is difficulty manufacturing the engine. To date only the Mazda RX-7 uses a rotary engine design. Other companies have constructed test engines, but have not mass-produced them.

(d) There is a waste problem with the fuel/air mixture. A small amount of the fuel/air mixture used for combustion is lost during the engine rotation process. This is due to the triangular shape of the rotor. As the rotor rotates, there is a point where some of the fuel/air mixture escapes via the exhaust port.

(e) There is difficulty in repairing the engine. Problems inside the rotor chamber are very difficult to get to. Rotary engines are in effect pressure sealed. Because of design problems, opening one up is no small task.

SUMMARY OF THE INVENTION

Accordingly, the previous disadvantages are remedied in our invention. Several objects and advantages of the invention are:

(a) to provide an engine that has a low level of vibration without the use of balancing weights thus allowing for a lighter engine;

(b) to provide an engine with greatly reduced engine friction;

(c) to provide an engine that is relatively easy to manufacture;

(d) to provide an engine that comprises few parts;

(e) to provide an engine that is smaller and more compact than existing ones;

(f) to provide an engine that conserves the fuel/air mixture.

Further objects and advantages are to provide an engine that because of the above listed objects and advantages will allow for superior gas mileage and performance.

DESCRIPTION OF THE PREFERRED EMBODIMENTS

Figure 1:
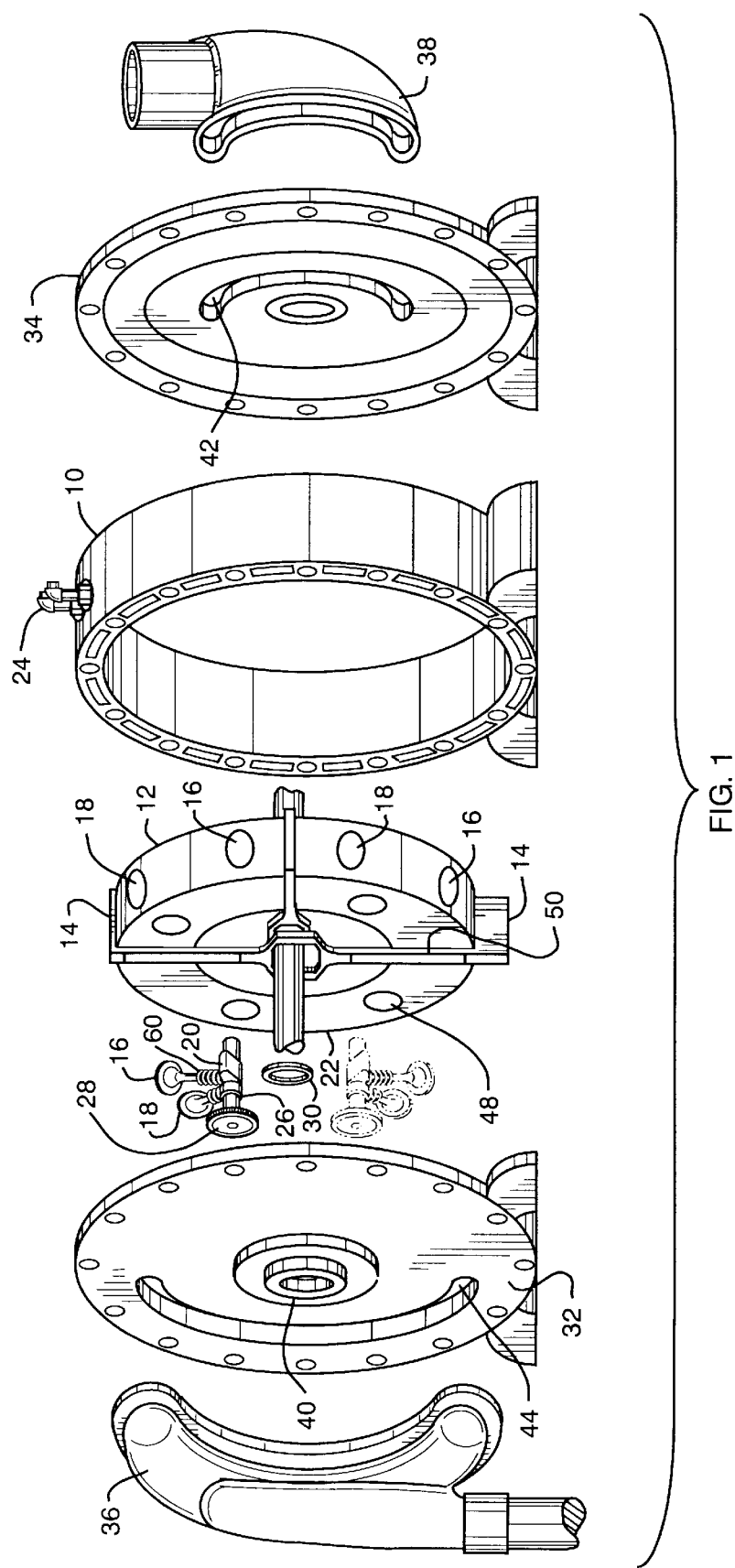
FIG. 1 shows an end view of a four chamber design with a straight type cam which utilizes rocker arms to manipulate the cam shaft.
Figure 2:
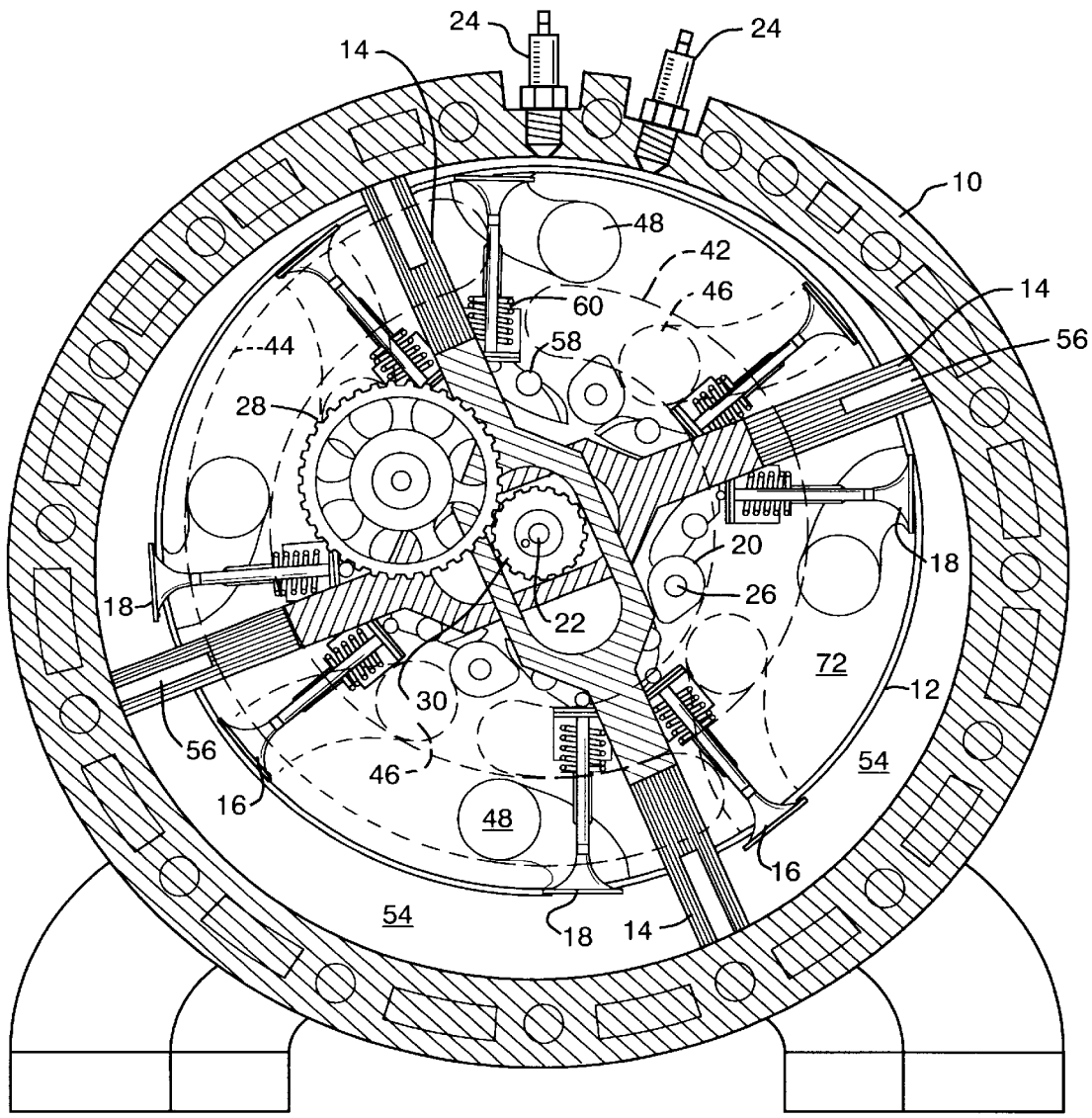
FIG. 2 shows a side view of a simplified side view of the same four chamber style engine.

An embodiment of the present invention is illustrated in FIG. 1 (end view of 4 chamber engine type) and FIG. 2 (side view of 4 chamber engine type).

The engine has a casing 10 which resembles a slightly oblong shaped cylinder. The rotor 12 which resembles a circular shaped cylinder is contained inside casing 10. Inside rotor 12 are separating vanes 14 which act to create separate chambers inside the engine. The separating vanes 14 slide in and out of the rotor to create these chambers.

Each of the afore mentioned vanes 14 is supported by vane support 50 and by the separating vane 14 on the opposite side of the rotor. The separating vanes 14 are connected to the wall of casing 10 in a way that still allows rotor 12 to rotate. Rotor 12 is connected to side casing via the vanes.

In between separating vanes 14 are inlet valves 16 and exhaust valves 18. Rotor 12 is also fastened to the drive shaft 22. The stationary gear 30 is fastened to the side casing 32 and has drive shaft 22 running through the output shaft support hole 40. Timing gear 28 opens and closes inlet valves 16 and exhaust valves 18. The valve spring 60 applies constant pressure on the valve to keep it closed.

For every two rotations of rotor 12 the cam shaft 26 rotates once. As cam shaft 26 rotates it moves the cam 20 which in turn acts to manipulate the rocker arm 58. It is this manipulation of rocker arm 58 which causes the valves to open and close.

The apex seal 56 will act to reduce any friction that may be caused between separating vanes 14 and casing 10. The spark plugs 24 are located in the area where rotor 12, inlet valves 16, and exhaust valves 18 come closest to the inner wall of the engine casing.

Replenishment of the fuel air mixture inside the separate chambers is accomplished by the opening and closing of the aforementioned valves. The fuel/air mixture travels through the intake manifold 38 via the timing side intake hole 42 which is located in the side casing 34 to the intake port 46 in the rotor 12. The fuel/air mixture then travels through the inlet valve and is sucked into the airtight chamber that has been created by the separating vanes.

After combustion, the spent gas leaves the chamber through the exhaust valve 18 into the exhaust port 48 in the rotor 12. From there the spent gas exits the engine via the timing side hole 44 in the side casing 32 and the exhaust track 36.

Figure 3:
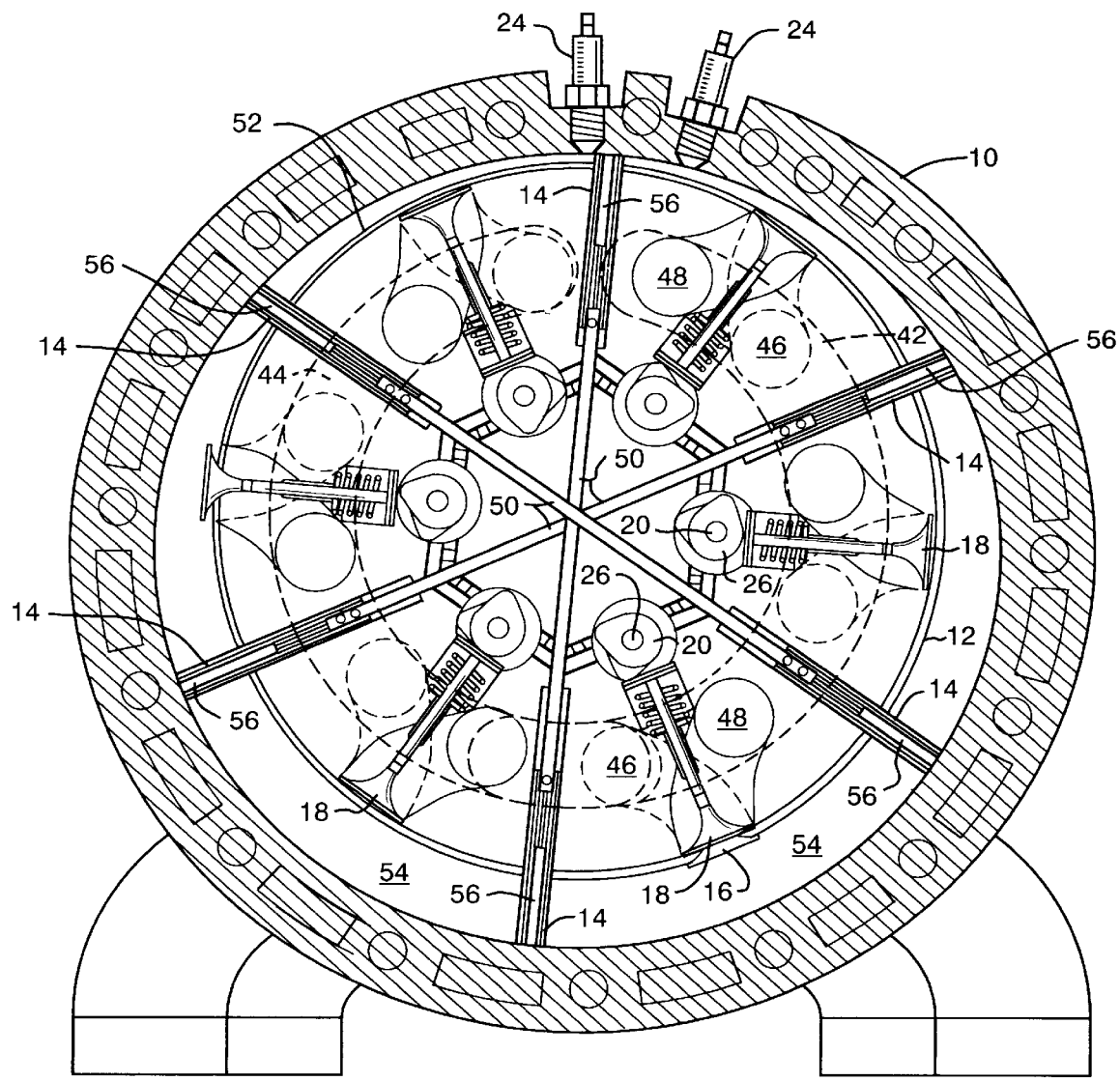
FIG. 3 shows an end view of a variation 6 chamber engine design with the inlet and exhaust valves in different possible positions and utilizing rocker arms to manipulate the cam shaft.

Instead of using gears in this process other possible variations of this design include; using belts, chains, or nuts to rotate cam shaft 26. There are also various possibilities envisioned for the separating vane system. An embodiment of one such possibility can be seen in FIG. 3 which shows a six chamber engine design. Any number of separating vanes 14 can be incorporated to allow for any number of chambers. Any number of valves may also be used. Additionally, to prevent friction a ball bearing or similar system can easily be installed for the separating vanes 14 as they slide. Furthermore, a crank and cam shaft will easily accomplish the same vane 14 manipulation.

Given that the area where the rotor and the valves come closest to the chamber wall and the spark plugs are located is 0 degrees. 180 degrees marks the area where the rotor and valves are furthest from the chamber wall. From 0 degrees to 180 degrees the intake valve is open. As the inlet valve opens the fuel air mixture travels through the intake manifold and enters the rotor via the timing side intake hole.

From 180 degree to 360 degrees the inlet valve is closed and no fuel air mixture enters the chamber. At this time the fuel air mixture in the chamber is compressed. As the rotor nears a complete 360 degree cycle and the fuel air mixture is at its highest point of compression the spark plugs ignite. This combustion causes a rapid increase in chamber pressure causing the rotor to rotate. This process occurs from 360 degrees to 540 degrees. After this point the exhaust valve opens and the spent gas is purged through the rotor and out the timing side exhaust hole. This purging process occurs from 540 degrees to 720 degrees.

The four cycles of the engine are:

Cycle one-intake process 0–180 degrees

Cycle two-compression process 180–360 degrees=one rotation

Cycle three-combustion process 360–540 degrees

Cycle four-purge process 540–720 degrees=two rotations

This invention achieves the same results in two rotations as does a conventional four stroke internal combustion engine.

Accordingly, the reader will see that the invention described here has numerous advantages over existing designs. This invention is smaller and lighter than existing designs. Additionally, the advantages described below will allow for superior gas mileage and performance in that this invention;

solves vibration problems;

eliminates the need for balance weights;

has greatly reduced engine friction compared to the piston engine and existing rotor engine models;

is easy to manufacture;

solves existing rotary engine fuel/air mixture waste problems;

is easy to maintain and repair because of it's simplicity.

Although the description above contains many specificities, these should not be construed as limiting the scope of the invention but as merely providing illustrations of some of the presently preferred embodiments of the engine. For example the engine can have any number of separating vanes or a slightly different shaped engine casing, etc.

Thus the scope of the invention should be determined by the appended claims and their legal equivalents, rather than by the examples given.

We claim:

1. A rotary engine, comprising:
   a housing defining a chamber having an interior surface and ends and a central chamber axis passing therethrough;
   a drive shaft disposed within the chamber and having a longitudinal drive shaft axis parallel to the chamber axis, wherein the drive shaft axis is disposed a non-zero distance from the chamber axis;
   a rotor being substantially cylindrical and rotatably disposed about the drive shaft; and
   a plurality of vane pairs disposed within the rotor, each vane pair being movable relative to the drive shaft and having two exterior vane portions substantially disposed along a diameter of the rotor and being in slidable contact with the interior surface of the chamber, wherein each of the vane portions supports a corresponding one of the vane portions that is disposed opposite thereto along a shared diameter of the rotor; and
   a plurality of inlet valves disposed in the rotor in fluid communication with an inlet port defined in an end of the chamber to permit a fuel/air mixture to enter the chamber, said plurality of inlet valves serving to regulate the amount of fuel/air mixture which may enter the chamber.

2. The rotary engine of claim 1, wherein an exhaust port is defined in the chamber to permit exhaust gasses to exit the chamber, and further comprising at least one exhaust valve disposed within the exhaust port to control the exit of exhaust gasses from the chamber.

3. The rotary engine of claim 1, wherein the valves are disposed about the rotor.

4. The rotary engine of claim 3, further comprising:
   a timing gear operably associated with the cam shaft for opening and closing the inlet valves and the exhaust valves.

5. The rotary engine of claim 4, further comprising:
   a spark plug, for igniting the fuel/air mixture at a point during rotation of the rotor when the fuel/air mixture is at maximum compression.

6. The rotary engine of claim 1, further comprising:
   a cam shaft disposed within said rotor, responsive to rotation of the rotor; and
   means, responsive to the cam shaft, for manipulating the inlet valves.

7. The rotary engine of claim 6, further comprising:
   at least one cam disposed on said cam shaft; and
   a plurality of rocker arms disposed within said rotor adjacent said cam shaft, said rocker arms being responsive to the cam for actuating the inlet valves.

8. The rotary engine of claim 1, wherein the vane pairs define four subchambers within the chamber.

9. The rotary engine of claim 8, wherein the valves are disposed about the rotor.

10. The rotary engine of claim 1, wherein the vane pairs define six subchambers within the chamber.

11. A rotary engine comprising:
    a housing defining a chamber having an interior space and a central chamber axis passing therethrough;
    a drive shaft disposed within the chamber and having a longitudinal drive shaft axis parallel to the chamber axis, wherein the drive shaft is disposed a non-zero distance from the chamber axis;
    a rotor being substantially cylindrical and rotatably disposed about the drive shaft;
    at least one inlet port defined in the rotor to permit a fuel/air mixture to enter the chamber;
    at least one exhaust port being defined in the rotor to permit exhaust gasses to exit the chamber;
    a plurality of vane pairs within the rotor, each vane pair being movable relative to the drive shaft and having a middle portion disposed about said drive shaft, and each vane pair having two exterior vane portions substantially disposed along a diameter of the rotor and being in slidable contact with the interior surface of the chamber;
    at least one inlet valve disposed within the at least one inlet port to regulate the amount of fuel/air mixture which may enter the chamber;

at least one exhaust valve disposed within the at least one exhaust port to control the exit of the exhaust gasses from the chamber;

a cam shaft disposed within the rotor and carrying a cam;

a rocker arm, disposed with the rotor adjacent the cam shaft, said rocker arms being responsive to the cam on end and being operable associated with at least one of the inlet and exhaust valves on an opposite end; and a timing gear disposed about the cam shaft and rotating in response to rotation of the rotor to open and close the intake valves.

12. The rotary engine of claim 11, wherein the vane pairs define four subchambers within the chamber.

13. The rotary engine of claim 11, wherein the vane pairs define six subchambers within the chamber.

14. The rotary engine of claim 11, further comprising:

a spark plug, for igniting the fuel/air mixture at a point during rotation of the rotor when the fuel/air mixture is at maximum compression.

* * * * *